(12) United States Patent
Moradell

(10) Patent No.: US 6,390,556 B1
(45) Date of Patent: May 21, 2002

(54) VEHICLE SEAT FITTED WITH A PIVOT MECHANISM

(75) Inventor: Pierre Moradell, St Georges des Groseillers (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/649,644

(22) Filed: Aug. 29, 2000

(30) Foreign Application Priority Data

Sep. 3, 1999 (FR) .............................. 99 11063

(51) Int. Cl.$^7$ ................................. B60N 2/10
(52) U.S. Cl. ....................................... 297/362
(58) Field of Search ..................... 297/362, 361.1, 297/452.18, 373

(56) References Cited

U.S. PATENT DOCUMENTS

| | | | | |
|---|---|---|---|---|
| 4,020,717 A | * | 5/1977 | Johnson | |
| 5,209,637 A | * | 5/1993 | Reubeuze | |
| 5,438,732 A | * | 8/1995 | Engels et al. | |
| 5,516,198 A | * | 5/1996 | Yokoyama | |
| 5,536,217 A | * | 7/1996 | Droulon et al. | |
| 6,168,235 B1 | * | 1/2001 | Freund | |

* cited by examiner

Primary Examiner—Milton Nelson, Jr.
(74) Attorney, Agent, or Firm—Marshall, Gerstein & Borun

(57) ABSTRACT

A vehicle seat comprising two frames mounted so as to pivot relative to one another about an axis of rotation by a pivot mechanism comprising two side rigid plates fixed to the frames of the seat at least one of the side plates having an external relief arrangement which is disposed about the axis of rotation and co-operates, by meshing, with a complementary relief arrangement of the corresponding frame. This side plate is also integral with a single central fixing member onto which a complementary threaded fixing member is screwed, applying a flange against the frame of the seat in the direction of the side plate.

9 Claims, 2 Drawing Sheets

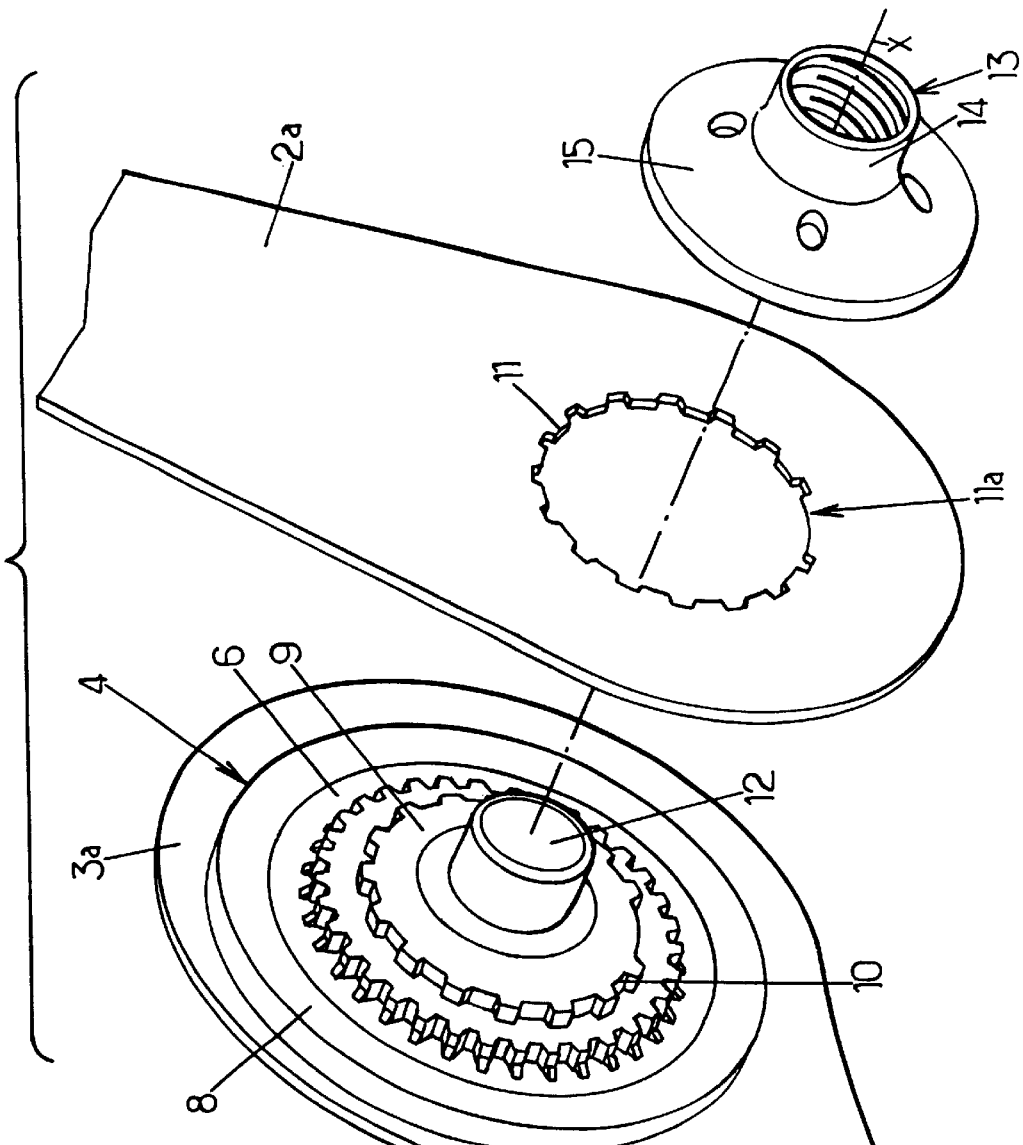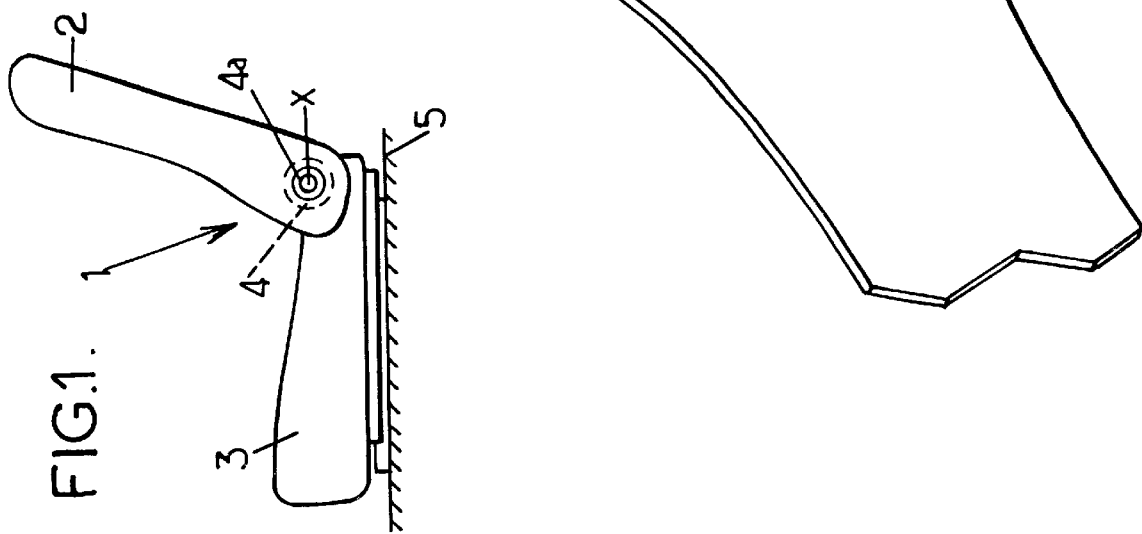

VEHICLE SEAT FITTED WITH A PIVOT MECHANISM

FIELD OF THE INVENTION

The present invention relates to vehicle seats fitted with pivot mechanisms.

More specifically, the invention relates to a vehicle seat having first and second frames, mounted so as to pivot relative to one another about an axis of rotation by means of at least one pivot mechanism, designed to allow a user to choose and lock a relative angular position of the first and second frames, this pivot mechanism comprising first and second rigid side plates fixed respectively to the first and second frames of the seat, at least the first side plate having an external relief design (projecting or indented) arranged in an annular zone essentially centred on the axis of rotation and which co-operates by meshing with a matching relief design of the first frame in order to lock this first side plate and this first frame relative to one another in rotation.

BACKGROUND OF THE INVENTION

Document EP-A-0 505 229 describes an example of such a seat, as does document EP-A-0 502 774. In the known seats of this type, the first side plate is permanently joined to the first frame by several screws, generally three, so that mounting the pivot mechanism on the seat frames is a lengthy and costly operation. Furthermore, these screws provide anchoring at certain points only, which does not prevent the frame from becoming deformed and in particular from buckling when subjected to a high pivot torque (in the event of an accident, for example), which limits the mechanical strength of the seat.

OBJECTS AND SUMMARY OF THE INVENTION

The specific objective of this invention is to overcome these drawbacks.

To this end, the invention proposes a seat of the type in question, wherein the first side plate is permanently fixed by a single, threaded fixing member which extends substantially along the axis of rotation and co-operates with a complementary threaded fixing member by a screwing action, applying a flange against the first frame in the direction of the first side plate, at least on an annular bearing zone adjacent to a relief design of the first side plate and a matching relief design of the first frame.

As a result of these features, the pivot mechanism is easier to mount on the seat frames and the mounting is stronger.

In preferred embodiments of the invention, one and/or the other of the following features may be incorporated:

- the relief arrangement of the first side plate is provided as a toothed ring, centred on the axis of rotation and having radially oriented teeth, the complementary relief arrangement also being provided in the form of a ring of teeth;
- the flange is integral with the complementary threaded fixing member and bears on a smooth and flat part belonging to the first frame;
- the flange is a separate part from the complementary threaded fixing member;
- the flange is immobilised in rotation due to a meshing action with the relief design of the first side plate;
- the complementary threaded fixing member has a head which bears on a washer which in turn bears on the flange;
- the complementary threaded fixing member is a screw;
- the complementary threaded fixing member is a nut which is screwed from the outside onto a threaded end constituting said threaded fixing member;
- the first and second frames belong respectively to a seat part and a backrest forming the seat.

BRIEF DESCRIPTION OF THE DRAWINGS

Other features and advantages of the invention will become clear from the following description of several of its embodiments, given by way of illustration and not restrictive in any respect, and with reference to the appended drawings.

Of the drawings:

FIG. 1 is a schematic view illustrating a vehicle seat with which different embodiments of the invention may be used, FIG. 3 is an exploded perspective view illustrating how the pivot mechanism of FIG. 2 is fixed to the frame of the backrest.

MORE DETAILED DESCRIPTION

Figure 5:
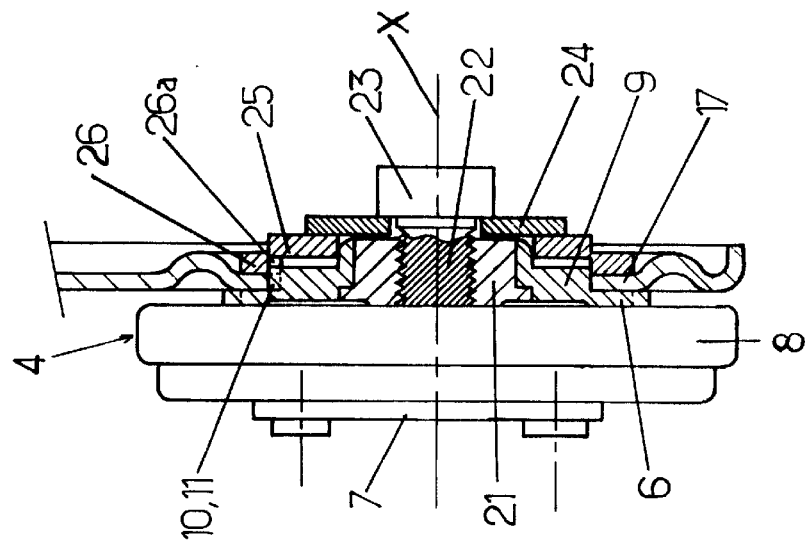
FIGS. 4 and 5 are views similar to that of FIG. 2, showing second and third embodiments of the invention respectively.

The same references are used in the different drawings to denote identical or similar elements.

FIG. 1 illustrates a vehicle seat comprising a backrest 2 which is mounted on a seat part 3 so as to pivot about a transverse horizontal axis X by means of at least one pivot mechanism 4, controlled by a handle or rotating wheel 4a, for example, the seat part 3 being in turn supported on the floor 5 of the vehicle.

Figure 2:
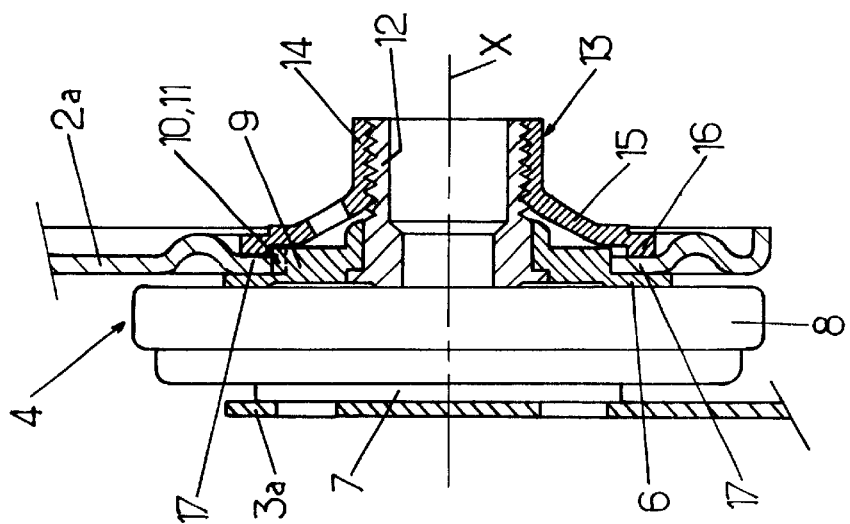
FIG. 2 is a view in partial axial section showing one of the pivot mechanisms linking the backrest to the seat part of the seat illustrated in FIG. 1, in a first embodiment of the invention.

As illustrated in FIGS. 2 and 3, the pivot mechanism 4 comprises, in this particular example:

- a first rigid metal side plate 6, which is disc-shaped and centred on the axis X, fixed to a rigid frame 2a of sheet metal belonging to the backrest 2,
- a second rigid metal side plate 7 which is disc-shaped and centred on the axis X, fixed to a rigid frame 3a of sheet metal belonging to the seat part 2,
- an annular metal ring 8 which is crimped on the contour of the first and second side plates 6, 7, bounding therewith a closed casing which encloses an adjusting device (not illustrated) enabling a user to choose and lock the angular position of the backrest 2.

This adjusting device may be of the type disclosed in document EP-A-0 505 229 or the type disclosed in document EP-A-0 502 774, for example.

The first side plate 6 has a central part 9 with a relief design, which may project axially towards the frame 2a of the backrest and which has a ring of external teeth 10. This toothed ring is substantially centred on the axis of rotation X of the backrest and comprises teeth oriented radially towards the exterior.

Meshing with the toothed ring 10, substantially without any clearance, is a complementary ring of teeth 11 which is formed on the contour of a cut-out 11a provided in the frame 2a of the backrest, so that said frame 2a of the backrest is immobilised in rotation relative to the first side plate 6.

More generally, the side plate 6 could have any other relief design, indented or projecting, arranged in an annular layout about the axis X and co-operating by meshing with a complementary relief design of the frame 2a.

Furthermore, the first side plate 6 of the pivot mechanism is integral with an externally threaded, tubular connecting piece 12, which could optionally be formed in a single piece with said side plate. This connecting piece extends substantially along the axis X through the cut-out 11a of the frame 2a of the backrest.

Screwed onto the connecting piece 12 is a metal part 13 with a threaded central part 14 forming a nut and having a flange 15 made integrally with said nut and extending radially towards the exterior as far as an annular bearing ridge 16 centred on the axis X.

When the part 13 is screwed on, the ridge 16 is applied against an annular bearing zone 17 of the frame 2a of the backrest, located immediately to the outside of the circular teeth 10, 11. This bearing zone 17 is then clamped between the ridge 16 and a flat annular zone of the first side plate 6.

The first side plate 6 can therefore be mounted on the frame 2a of the backrest particularly easily and quickly, whilst guaranteeing high mechanical strength to withstand the torques which may be exerted on the backrest 2 of the seat, particularly in the event of an accident.

The second side plate 7 of the pivot mechanism may also be fitted on the frame 3a of the seat part in a manner similar to that used for the first side plate 6 or, in the conventional manner, by screwing or alternatively welding, in which case the frame 3a may be reinforced as compared with the frame 2a.

Clearly, it would also be possible for only the second side plate 7 to be fixed to the frame 3a of the seat by the fixing means proposed by the invention, in which case the first side plate 6 would be fixed to the frame 2a of the backrest by conventional means and said frame 2a could optionally be stronger than the frame 3a.

Figure 4:
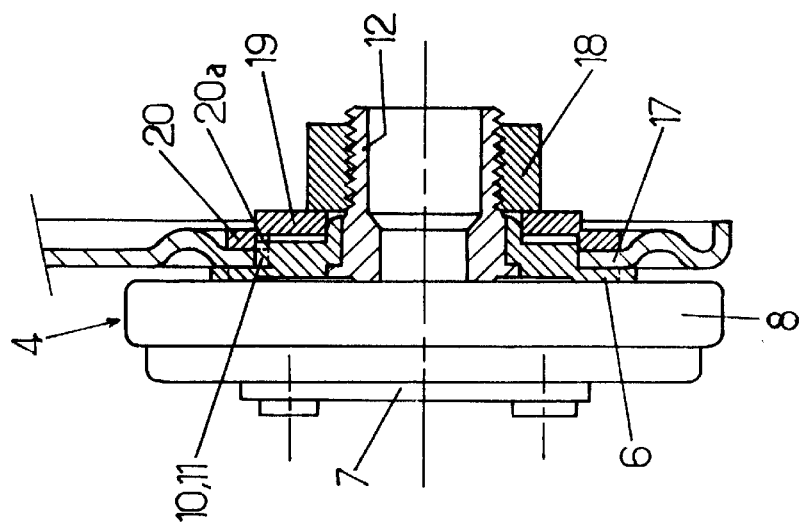

In the second embodiment of the invention, which is illustrated in FIG. 4, the part 13 is replaced by a nut 18 which is screwed onto the connecting piece 12, applying an outer annular ridge 20 of a metal flange 19 against the annular bearing zone 17 mentioned above.

In this case, it may be of advantage to provide the internal periphery of the annular ridge 20 with teeth 20a which will co-operate in a meshing action with the teeth 10 of the first side plate 6, said teeth 10 projecting axially, relative to the frame 2a, in the direction of the flange 19.

Finally, in the embodiment illustrated in FIG. 5, flange 25 is similar to flange 19 of FIG. 4 and also has internal teeth 26a which co-operate in a meshing action with the teeth 10 on the internal periphery of the outer annular ridge 26a of said flange.

In this embodiment, the externally threaded connecting piece 12 is replaced by an internally threaded connecting piece 21, which is substantially centred on the axis X.

A screw 22 is screwed into this connecting piece 21, the enlarged head 23 of which bears against a washer 24, which in turn applies the annular ridge 26 of the flange 25 against the annular bearing zone 17 of the frame 2a of the backrest.

I claim:

1. A vehicle seat having first and second frames mounted so as to pivot relative to one another about an axis of rotation by means of at least one pivot mechanism, designed to allow a user to choose and lock a relative angular position of the first and second frames, this pivot mechanism comprising first and second rigid side plates fixed respectively to the first and second frames of the seat, at least the first side plate having a relief arrangement disposed in an annular zone substantially centred on the axis of rotation which co-operates, by meshing, with a complementary relief arrangement of the first frame in order to immobilize this first side plate and this first frame relative to one another in rotation, wherein the first side plate is integral with a single threaded fixing member which extends substantially along the axis of rotation and which co-operates with a complementary threaded fixing member by a screwing action, applying a flange against the first frame in a direction of the first side plate, at least on an annular bearing zone adjacent to the relief arrangement of the first side plate and the complementary relief arrangement of the first frame.

2. A seat as claimed in claim 1, in which the relief arrangement of the first side plate is in the form of a toothed ring which is substantially centered on the axis of rotation and which has radially oriented teeth, the complementary relief arrangement also being a ring of teeth.

3. A seat as claimed in claim 1, in which the flange is joined to the complementary threaded fixing member and bears against a smooth and flat part belonging to the first frame.

4. A seat as claimed in claim 1, in which the flange is a separate part from the complementary threaded fixing member.

5. A seat as claimed in claim 4, in which the flange is immobilized in rotation by meshing with the relief arrangement of the first side plate.

6. A seat as claimed in claim 4, in which the complementary threaded fixing member has a head which bears against a washer which is in turn supported on the flange.

7. A seat as claimed in claim 1, in which the complementary threaded fixing member is a screw.

8. A seat as claimed in claim 1, in which the complementary threaded fixing member is a nut which is screwed onto an externally threaded connecting piece constituting said threaded fixing member.

9. A seat as claimed in claim 1, in which the first and second frames belong respectively to a backrest and a seat part comprising the seat.

* * * * *